April 7, 1953  F. R. DAVIS  2,634,035
CAN FILLING APPARATUS
Filed Feb. 19, 1951  3 Sheets-Sheet 1
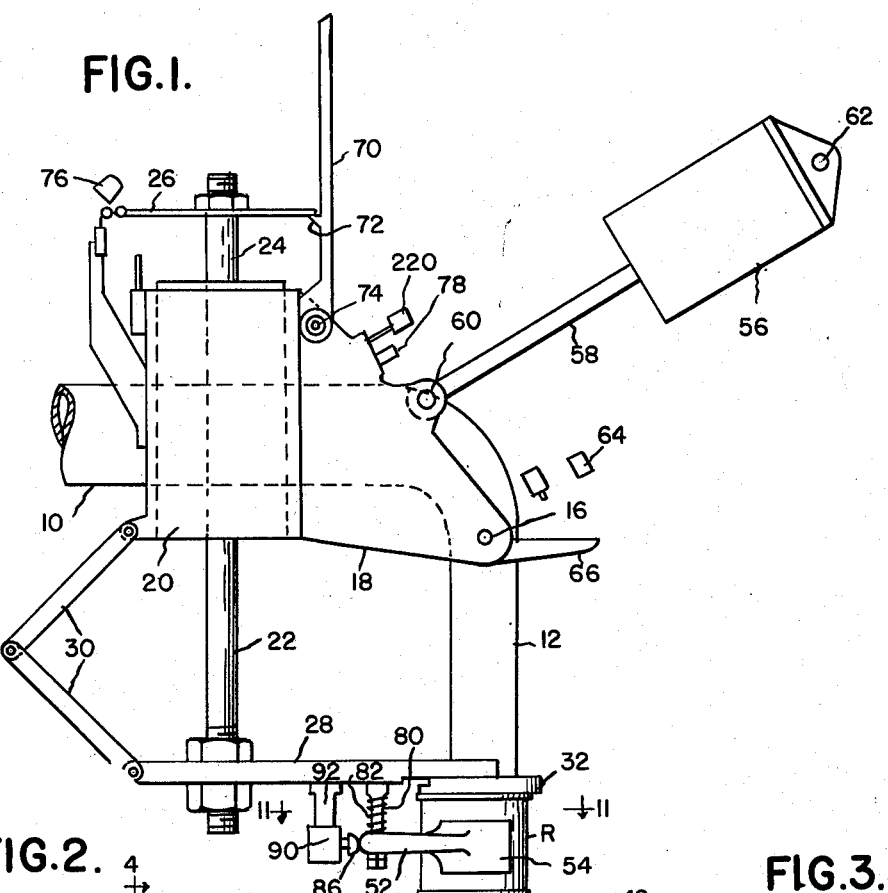
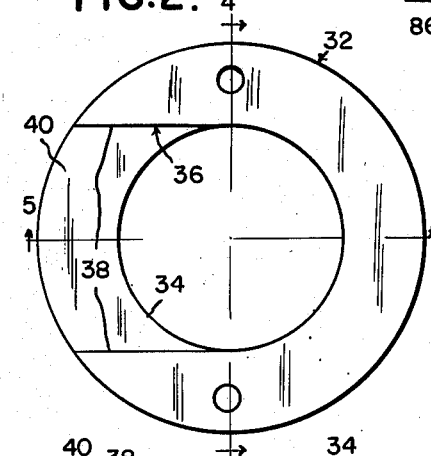
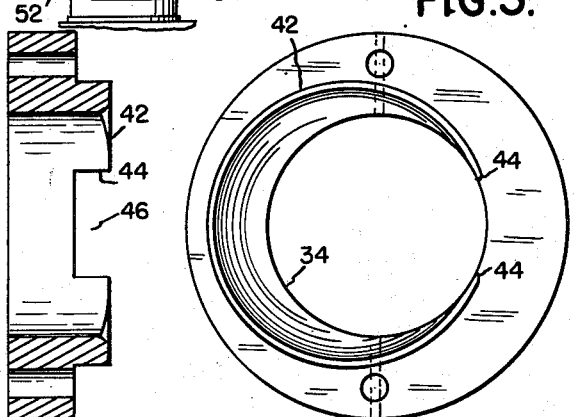
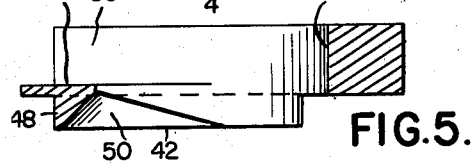
INVENTOR.
FRANK R. DAVIS
BY Whittemore,
Hulbert & Belknap
ATTORNEYS April 7, 1953  F. R. DAVIS  2,634,035
CAN FILLING APPARATUS
Filed Feb. 19, 1951  3 Sheets-Sheet 2
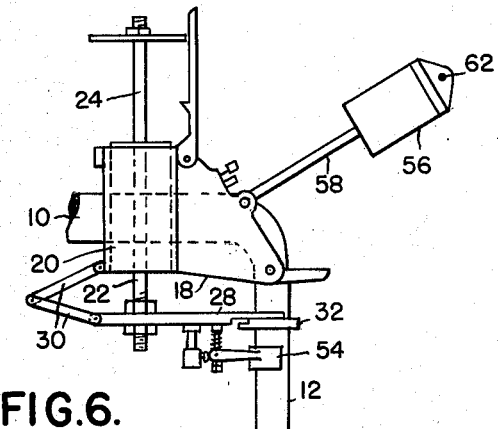
FIG.6.
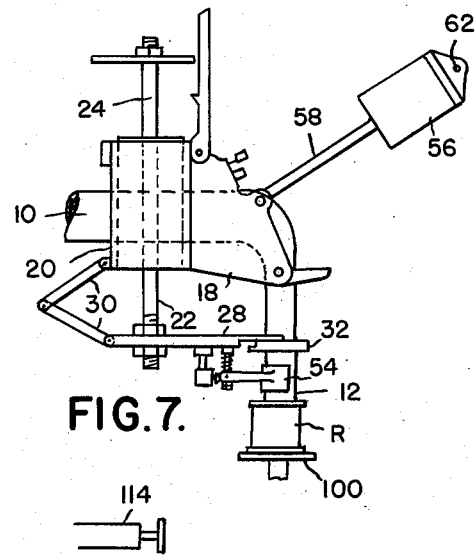
FIG.7.
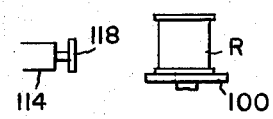
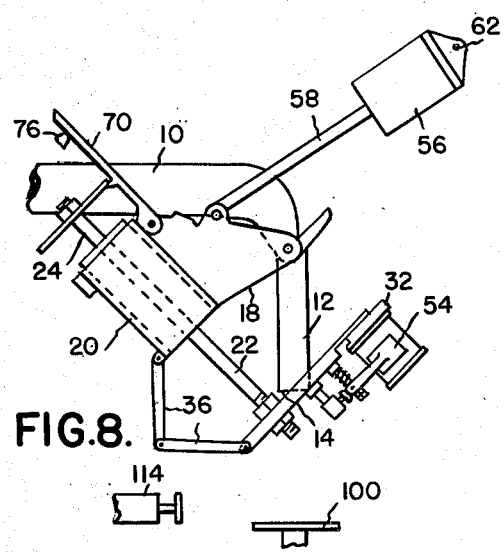
FIG.8.
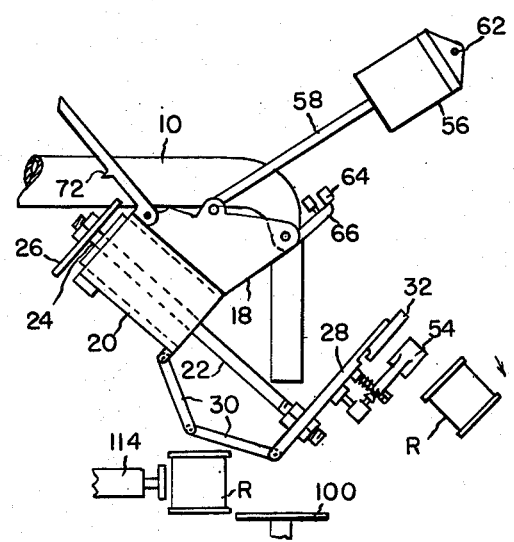
FIG.9.
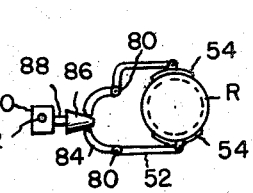
FIG.11.
INVENTOR.
FRANK R. DAVIS
BY Whittemore,
Hulbert & Belknap
ATTORNEYS Patented Apr. 7, 1953

2,634,035

UNITED STATES PATENT OFFICE 2,634,035

CAN-FILLING APPARATUS

Frank R. Davis, Birmingham, Mich., assignor to The Armstrong Company, Detroit, Mich., a corporation of Michigan Application February 19, 1951, Serial No. 211,634

26 Claims. (Cl. 226—24)

The present invention relates to can filling apparatus, and more particularly to apparatus designed especially for filling cans or other suitable receptacles with a material which is a cohesive plastic and which may to some extent tend to adhere to surfaces in which it is in contact.

It is an object of the present invention to provide automatic apparatus for feeding measured quantities of cohesive plastic material into a can or other receptacle, cleanly severing the material in the can from the mass of material, and moving the filled can away from the filling station to permit advance of a succeeding can to such station.

It is a further object of the present invention to provide means for severing a measured quantity of cohesive plastic material from a mass which includes a nozzle having a circular discharge lip and a cutting blade or ring having an internal arcuate surface of substantially 180 degrees movable in an arcuate path to wipe completely across the lip of the nozzle.

It is a further object of the present invention to provide can filling apparatus comprising means for advancing an empty can upwardly over the lower end of a discharge nozzle to position the bottom of the can adjacent the nozzle, and means for feeding cohesive plastic material through the nozzle to fill the can and thus to force the same downwardly with respect to the nozzle, means operable upon predetermined downward movement of the can to arrest feeding movement of the material, to sever the material in the can from the bulk mass of the material, and to move the can away from the nozzle to permit advance of a second can to position to receive the material.

It is a further object of the present invention to provide can filling apparatus comprising a depending nozzle terminating in a circular discharge lip, a pivoted support adjacent the nozzle mounted for rocking movement about an axis perpendicular to the axis of the nozzle, a carrier movable toward and away from said support, a cutoff ring on said carrier, a can clamp on said carrier, means for moving said carrier downwardly to bring said cutoff ring into contact with the open top of a filled receptacle and to bring the clamp into position to engage the can, means for swinging said support in an arcuate path to move said can away from said nozzle and to cause said cutoff ring to wipe completely across the circular lip on the nozzle.

Other objects and features of the invention will become apparent as the description proceeds, especially when taken in conjunction with the accompanying drawings, wherein:

Figure 1 is an elevational view of the major elements of the can filling apparatus.

Figure 2 is a top plan view of the cutoff plate or ring.

Figure 3 is a bottom plan view of the cutoff plate or ring.

Figure 4 is a section on the line 4—4, Figure 2.

Figure 5 is a section on the line 5—5, Figure 2.

Figure 10:
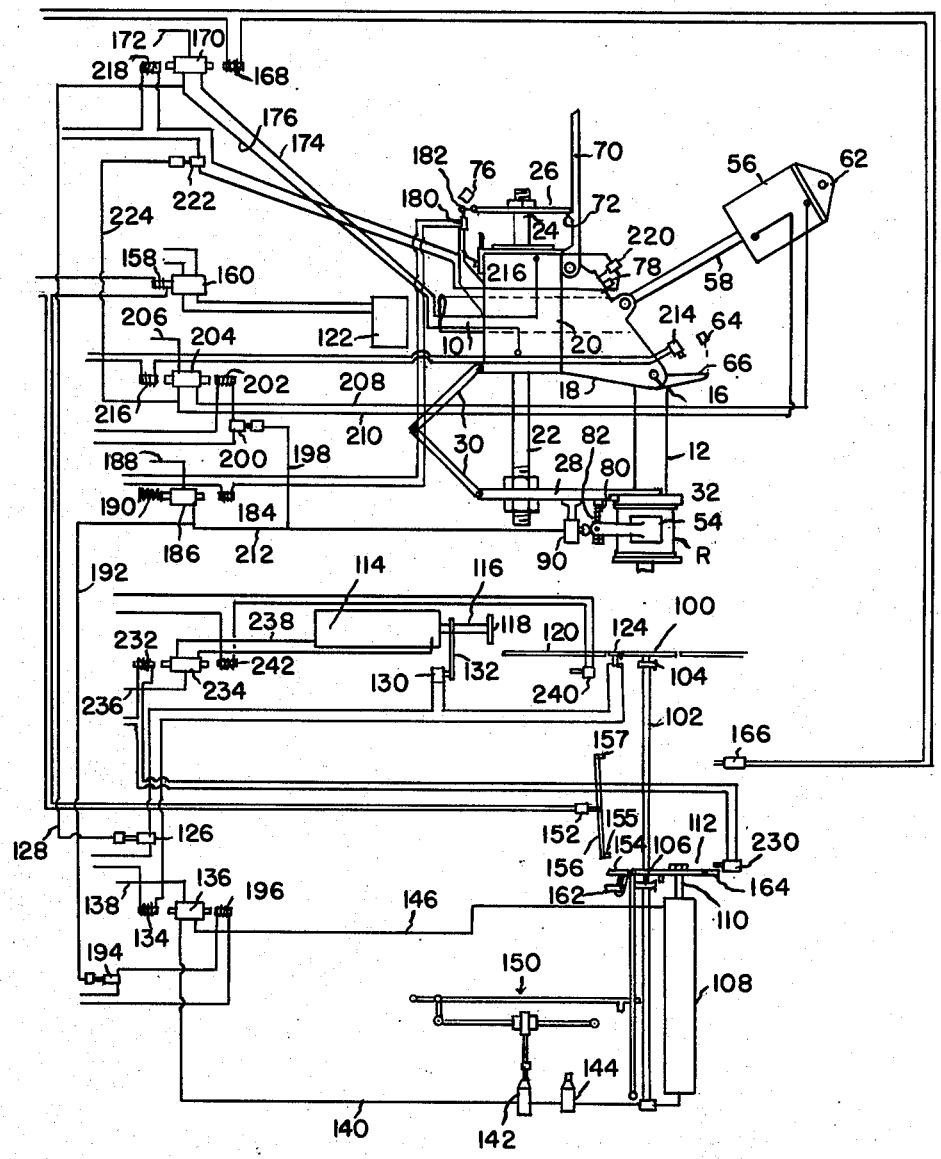

Figures 6, 7, 8, and 9 are somewhat diagrammatic elevational views illustrating successive stages in the operation of the apparatus.

Figure 10 is a combined partially diagrammatic elevational view of the can filling apparatus including a disclosure of suitable electric and pneumatic controls and actuators therefor.

Figure 11 is a partly diagrammatic sectional view on the line 11—11, Figure 1.

Referring now to Figure 1, the can filling apparatus includes or is associated with a discharge conduit 10 having a downwardly extending nozzle 12 which terminates in a circular lip 14. It will be appreciated that the circular lip 14 is constituted by the lower edge of the tubular nozzle 12.

Rigidly associated with the conduit 10 is a pivot connection 16 and mounted for rocking movement on the pivot connection 16 is a support 18. The axis of the pivot connection 16 in the arrangement illustrated extends horizontally and is perpendicular to the axis of the depending nozzle portion 12. Mounted on the pivoted support 18 is a cylinder 20 which contains a suitable piston (not shown) connected to a piston rod 22 which extends completely through the cylinder and has an upper portion 24 carrying a rigid plate 26. Suitably secured to the lower end of the piston rod 22 is a carrier 28 which is movable toward and away from the cylinder 20 upon movement of the piston therein. The carrier 28 is connected to the cylinder 20 by interconnecting links 30.

Secured to the underside of the carrier 28 is a cutoff plate or ring 32 which is shown in detail in Figures 2-5. As illustrated, the cutoff plate or ring is, in the present embodiment, generally in the form of a ring and will be so referred to herein. However, the outer shape of the cutoff member is not critical and it will be appreciated that it might be provided in a form other than annular. As seen in Figures 2-5, the cutoff ring 32 is provided with a relatively large circular opening 34 therethrough, the size of this opening being sufficient to permit the ring to be moved upwardly over the depending nozzle portion 12. The cutoff ring is provided with a slot 36 extending into the opening 34 from one side thereof. The slot is provided with flat opposed parallel surfaces 38 which extend tangentially with respect to the opening 34. The bottom 40 of the slot is parallel to the plane of the ring, as best seen in Fig. 5. Partially surrounding the opening 34 at the underside of the ring 32 is a depending arcuate flange 42 which is eccentrically located with respect to the opening 34 and which terminates at end portions 44 leaving a gap therebetween, best illustrated at 46 in Figure 4. The outer wall 48 of the flange 42, as best seen in Figure 5, is of cylindrical form while the inner wall 50, as best seen in Figure 5, is of conical formation.

The interconnection between the flat surface 40 which forms the bottom of the slot 36 with the inner cylindrical surface of the opening 34 provides a semi-circular or arcuate cutting or wiping edge which in use wipes completely across the bottom surface of the circular lip 14 at the lower end of the nozzle 12. Moreover, the incompletely circular depending flange 48 extends into the open top of a can or receptacle indicated at R and thus locates the can eccentrically with respect to the axis of the nozzle 12, as best illustrated in Figure 1.

The operating structure includes a pair of clamp arms 52 having clamping surfaces 54 adapted to engage opposite sides of the can R so that as the carrier 28 and support 18 are swung about the pivot axis 16, the can is retained against the underside of the cutoff ring 32.

Power means are provided for swinging the support 18 about its pivot axis 16 and includes an air cylinder 56 having a piston therein connected to a piston rod 58 pivoted to the support 18 by a pivot connection indicated at 60. The piston 56 is supported for rocking movement about a pivot support 62. Rocking movement of the support 18 in a counterclockwise direction, as seen in Figure 1, is limited by a rigid abutment 64 which is engaged by a projecting stop finger 66 carried by the support 18.

Mounted on the support 18 is a movable stop arm 70 having a stop shoulder 72 thereon adapted to be engaged by the rigid plate 26 during one phase of the operation as will subsequently be described. The arm 70 is pivoted to the support by pivot means indicated generally at 74 and includes a spring (not shown) urging arm 70 in counterclockwise direction as seen in Figure 1. Also mounted in fixed relation to the pivot support 18 is an abutment 76 adapted to engage the pivoted arm 70 at a certain stage of swinging movement of the support 18 so as to release the shoulder 72 from beneath the plate 26 to permit continued movement of the piston rod 22. A third stop 78 is provided adapted to limit clockwise rotation of the support 18 about its pivot axis 16, the support 18 being shown in abutting relation to the stop 78 in Figure 1.

Referring now to Figure 11 the clamp means is illustrated in some detail. Clamp arms 52 carrying clamping plates 54 are independently pivoted for rocking movement about vertical pivot supports 80 and are provided with springs 82 urging the clamping plates 54 apart. The clamp arms 52 include inwardly extending portions 84 associated with a wedge-like cam 86 connected to a piston rod 88 extending from an air cylinder 90 carried by a support 92 extending downwardly from the carrier 28. Obviously, when air is admitted to the cylinder 90 moving the cam 86 to the right, as seen in Figure 11, clamping plates 54 are pressed inwardly against opposite sides of the can or other receptacle R. When air pressure is released the spring means 82 causes the plates 54 to separate, thus releasing the can R.

Associated with the operating part of the structure so far described is mechanism illustrated in Figure 10 which comprises a vertically movable table 100 carried by a vertically extending rod 102 mounted in guides 104 and 106. Vertical movement is imparted to the table 100 by an air cylinder 108 having a piston therein connected to a piston rod 110 extending to a transversely extending arm 112 which is keyed or otherwise suitably secured to the vertical rod 102. Thus, movement of the piston within the cylinder 108 moves the arm 112 and the table 100 vertically in unison. The table 100 has associated therewith an air cylinder 114 which contains a piston connected to a piston rod 116 terminating in a pusher element 118 adapted to move cans along a stationary support surface 120 onto the vertically movable table 100.

In use a cohesive plastic material is fed through the conduit 10 and nozzle 12 by suitable means. Conveniently, this is accomplished by a conventional screw feed device for forcing the plastic material through the conduit and the screw feed device is indicated diagrammatically in Figure 10 at 112. In Figure 6 the structure is illustrated in the position which it assumes just prior to the filling operation on a can R. This condition is brought about by the presence of air pressure at the lower end of cylinder 20, at the lower left hand end of cylinder 56, and at the right end of cylinder 114. Pressure is cut off from clamping cylinder 90 and accordingly, the clamping plates 54 are in separated position. Placement of a can R on the table 100 closes a switch 124. At this time air operated switch 126 is held closed by air pressure in line 128 which connects to the bottom of the cylinder 20. Switch 130 is at this time closed by an arm 132 extending from the piston rod or ram 116 of the can advancing mechanism. A circuit at this time is completed through switches 124, 126, and 130, thus energizing solenoid 134 which shifts the double acting air valve 136 to admit air pressure from a supply line 138 to the lower end of cylinder 108 through conduit 140, a regulator 142, and a relief valve 144. Air is vented from the top of cylinder 108 through line 146 which is in turn vented to atmosphere at the two-way air valve 136.

Operation of cylinder 108 results in upward movement of the table 100 with an empty can thereon to the filling position, as illustrated in Figure 7. The pressure regulator 142 is connected to the mechanism operated by cylinder 108 through an adjustable linkage indicated generally at 150. The action of this linkage, details of which form no part of the present invention, is to vary the pressure maintained by the regulator to compensate for the increase in weight of the receptacle as it is filled. It also provides sufficient resistance to the downward motion of the receptacle as it is filled to cause the material entering the can through the nozzle 12 to be spread laterally to fill the receptacle completely from the bottom up.

Initial upward movement of the table 100 trips a switch 152 which is actuated by a pawl 154 pivotally supported on the arm 112. The pawl 154 is in position to engage the lower projection 155 on a rocker arm 156 carrying a second projection 157 at its upper end. Closure of the switch 152 energizes a relay 158, actuating starting switch 160 which energizes the motor of the means 122 for feeding plastic material through the conduit 10 and nozzle 12.

Operation of this motor forces the plastic material through the nozzle 12 into the can, thus forcing the can downwardly by a combination of increased weight of material therein and the actual application of mechanical force due to the force feeding of the plastic material until the pawl 162 engages the upper projection 157 on the rocker arm 156 and opens switch 152, thereby de-energizing solenoid 158 and opening motor switch 160, thereby arresting feeding action of the plastic material.

The pressure regulator 142 is so adjusted and changed in setting by the linkage that the pressure in the lower end of the cylinder 108 is increased to give the proper upward thrust to the can to insure spreading of the material as it enters the receptacle.

The next phase of operation of the mechanism is best understood by referring to Figure 10 since it results in movement of the parts to the position illustrated therein. Downward movement of the table 100 causes the pawl 164 carried by the arm 112 to close a switch 166 which takes place during continued downward movement of the table 100, and at the same time as pawl 162 opens switch 152 to stop the feed motor. Closure of switch 166 energizes a solenoid 168 which shifts to operate a two-way air switch 170 to admit air pressure from a supply line 172 through line 174 to the top of the air cylinder 20 and simultaneously vents the lower end of the cylinder 20 through return line 176. At the same time switch 126 opens since air pressure in the line 128 falls. This de-energizes the circuit to the solenoid 134. Admission of air under pressure to the top of cylinder 20 results in downward movement of the piston therein until it is stopped in cutoff position by engagement between the abutment 72 and the stop plate 26. This accurately positions the cutoff ring 32 so that its arcuate wiping surface is substantially in alignment with the lower edge of the lip 14 of the nozzle 12.

At the same time as the stop plate 26 comes into contact with the stop 72, it also closes a switch 180. The actuator 182 for the switch 180 is of known type such that it closes the switch 180 only upon downward movement of the plate 26 relative to the cylinder 20. Closure of the switch 180 energizes a solneoid 184 which operates air valve 186 to admit air from a supply line 188 to the clamping cylinder 90. The valve 186 is provided with a return spring 190 so that when solenoid 184 is de-energized, valve 186 is closed. Admission of air to the clamping cylinder 90 causes the clamping plates 54 to be pressed firmly against the sides of the can or receptacle R and thereby retains it in assembled position. The clamp continues to be actuated so long as solenoid 184 is energized which means that the clamp remains closed as long as the stop plate 26 remains on the abutment 72 on the movable stop arm 70.

As air pressure builds up in clamping cylinder 90 after the clamp is tightly closed, the pressure also builds up in air line 192 thereby closing air pressure switch 194. Closure of air pressure switch 194 energizes solenoid 196 to reverse the position of the two-way air valve 136. At the same time pressure builds up in air line 198 and closes an air pressure switch 200 thereby energizing solenoid 202 to actuate a two-way air valve 204 which controls admission of exhaust of air from a supply line 206 through lines 208 and 210 to the left and right hand ends of cylinder 56 respectively. Air pressure switches 200 and 194 are so related that switch 194 closes before switch 200 as pressure builds up in lines 192 and 198.

The closing of switch 194 first energizes solenoid 196 which shifts valve 136 to admit air under pressure to the top of cylinder 108 thereby moving table 100 downwardly. At this time the can is firmly clamped and is held in assembled relation against the underside of cutoff ring 32 while the table moves downwardly in position to receive an empty can. It will be recalled that switch 126 had previously opened, thereby breaking the circuit through switches 124, 126, and 130, and de-energizing solenoid 134.

Closure of pressure switch 200 energizes solenoid 202 to shift the two-position air valve 204 to position to admit air under pressure to the right hand or upper end of cylinder 56. This results in swinging movement of the support 18 about its pivot axis 16 and institutes a cutoff operation, the cutoff ring 32 wiping across the bottom of the lip of the discharge nozzle and the clamp carrying the filled can with the cutoff plate or ring 32 during this operation.

During the swinging movement of the support 18, which is a relatively rapid swinging movement, the arm 70 contacts fixed abutment 76 thus swinging the stop 72 out from beneath the stop plate 26. At this time air is still being admitted to the upper end of the cylinder 20 and accordingly the piston moves downwardly in the cylinder accompanied by a further motion of the carrier 28. Prior to release of the stop plate 26 the can and cutoff ring are moving in an arcuate path. However, when stop plate 26 is released an additional component of motion is introduced which is radially outwardly with respect to the fixed pivot axis 16. This component of motion is important since it in effect throws the can away from the assembled structure as it is released by the clamps. It is found in practice that by properly timing this additional component of motion, the can may be thrown with the required velocity so as to slide across a properly positioned supporting surface. Initial downward movement of the plate 26 from the position illustrated in Figure 8 results in opening the switch 180 which de-energizes solenoid 184 and cuts off air supply to the clamping cylinder 90, at the same time venting air line 212 to atmosphere through the valve 186. The reversing valve 186 as previously noted, is spring controlled and shifts to the second position instantly upon de-energization of solenoid 184. This releases the clamp and frees the can. Thus the can is released from the clamp at precisely the instant when the radial component of motion is added to its arcuate swinging motion. Swinging movement of the support 18 is abruptly terminated by engagement between the stop finger 66 thereon and the stationary abutment 64. The can is thus thrown clear by a combination of the abrupt arrest of swinging motion of its carrier and the abrupt termination of the radial component of motion.

A switch 214 is provided in position to be engaged by the stop finger 66 as the support 18 reaches its limit of swinging movement. Closure of switch 214 reverses a solenoid 216 which shifts air valve 204 to its other position, thereby reversing the supply of air to the cylinder 56 and initiating return swinging movement of the support 18.

Mounted on the support 18 is a switch 218 including a portion engageable by stop plate 26 when it moves to its extreme downward position. The switch 216 is connected to a solenoid 218 adapted to reverse air valve 170. However, the circuit to the solenoid 218 is adapted to be closed when the support 18 is brought back to its initial operating position, as shown in Figure 6. The pressure switch 222 is operated by a line 224 connected to the air line 210 which leads air under pressure to the lower end of the cylinder 56 to return the support 18 to loading position.

When the assembly, including the support 18, swings back to position against the mechanical stop 78 the switch 220 is closed. Air pressure now builds up in line 210, thus transmitting pressure to the pressure switch 222 closing the same. Switch 216 had previously been closed during downward movement of the stop plate 26. A circuit is therefore now complete through solenoid 218, thus shifting valve 170 to admit air to the lower end of the cylinder 20 through line 176, thereby raising carrier 28 to the position shown in Figure 6. As the piston in the cylinder 20 starts upwardly the switch 216 is opened, thus opening the circuit through solenoid 218. The piston continues to travel upwardly however because air valve 170 remains in its last set position until reversed by energization of the solenoid 168. The building up of pressure in the lower end of the cylinder 20 after the piston has reached the upper end of its travel, will operate switch 126 thus initiating a second cycle.

During the movement of the support 18 in the cutoff cycle and return, the table 100 and associated parts have moved downwardly. As the table approaches its lowermost position pawl 164 passes over switch 230 briefly completing a circuit through solenoid 232, thus shifting air valve 234 in a direction to admit air from a supply line 236 through line 238 to the left hand end of cylinder 114. It will be appreciated that the pusher element 118 and associated structure has a conventional can feeding system associated therewith which brings cans sequentially into position in front of the pusher element 118 to be advanced thereby onto the table 100. Therefore, as air is admitted to the left hand end of the cylinder 114 the pusher element 118 moves to the right and advances an empty can onto the table 100. When the pusher element reaches the end of its delivery stroke arm 132 closes a switch 240, thus completing a circuit to relay 242 reversing air control switch 234, admitting air to the right hand end of cylinder 114, and exhausting air from the left end, thus returning pusher element 118 to the left as seen in Figure 10. Movement of the pusher element 118 to the left results in closure of switch 130 by arm 132. This takes place during the cutoff cycle and thus switches 124 and 130 are closed prior to closure of switch 126 by the building up of air pressure in line 128. As a result, closure of switch 126 at the end of the cutoff cycle completes a circuit through relay 134, thus initiating another cycle of the system.

Briefly reviewed, with reference to Figures 6, 7, 1, 8, and 9, the mechanical movements of the parts are illustrated sequentially. In Figure 6 the can or receptacle R is shown on the table 100 directly beneath the nozzle 12. The cutoff ring 32 and clamp 54 are elevated in surrounding or partly surrounding relation to the depending nozzle.

The operation next comprises vertical movement of the can R to the position shown in Figure 7, at which time the bottom of the can engages the material being fed out of the lower end of the nozzle 12. At this time the feeding mechanism is in operation and the cohesive plastic material is being forced out of the nozzle into the can. Predetermined resistance to downward motion of the can causes the plastic material to spread out and thus to completely fill the can from the bottom upwardly as the can is forced downwardly. The cutoff ring 32 and clamping plates 54 remain in elevated position.

Eventually, when the can has been forced downwardly a predetermined distance corresponding to deposit of a predetermined quantity of plastic material therein, the operation of the feeding mechanism is stopped and carrier 28 is moved downwardly to a predetermined definite position as illustrated in Figure 1, in which the cutoff ring 32 is in proper position relative to the lip 14 at the lower end of the nozzle 12 to perform the cutoff operation. The clamping plates 54 are actuated to grip the can.

The table 100 moves downwardly and the support 18 swings in a counterclockwise direction as seen in Figure 8, thus causing the cutoff ring 32 to wipe completely across the depending lip 14 of the nozzle 12 and carrying the can with it in its arcuate movement in the clamps 54. In Figure 8 the apparatus is illustrated in the position it occupies when the movable stop arm 70 engages the fixed abutment 76. Thereafter, further swinging movement releases abutment 72 from beneath stop plate 26 permitting abrupt movement of the carrier 28 away from the support 18. Almost immediately thereafter stop finger 66 engages the rigid abutment 64 thus terminating swinging movement of the support 18. Release of the clamps 54 permits the filled can or receptacle R to continue its last motion and to be positively separated from the supporting structure including the depending flange 42 of the cutoff ring, which had up to the moment of operation extended inwardly of the can. The fact that the depending flange 42 is not completely circular facilitates separation of the can from the ring 32 and permits it to be deposited on a receiving surface along which it will slide a substantial distance to clear the machine due to its initial impetus.

While in Figure 10 there has been illustrated a complete system including electrical and pneumatic controls, it will be appreciated that essentially the machine is characterized by the mechanical motion of the parts and that these motions may be controlled by any suitable arrangement of electrical, pneumatic or mechanical controls. However, the particular system illustrated in Figure 10 is advantageous in that it prevents inception of any sequence of operation prior to completion of the preceding sequence thereof. It thus provides safety features in the operation of the machine. Moreover, it will be apparent that the machine will operate in a fully automatic manner so long as additional empty cans are sequentially advanced onto the support 120 in position to be engaged by the pusher element 118 and so long as adequate space is provided for reception of filled and discharged cans.

It will be appreciated that Figure 10 is diagrammatic and that switch actuators are employed of the type designed to operate a switch in one direction of movement therepast, movement in the opposite direction being accompanied by swinging of the actuator out of operative relation.

The drawings and the foregoing specification constitute a description of the improved can filling apparatus in such full, clear, concise and exact terms as to enable any person skilled in the art to practice the invention, the scope of which is indicated by the appended claims.

What I claim as my invention is:

1. Can filling apparatus comprising a depending stationary nozzle having a circular lip, a can supporting platform movable vertically beneath said nozzle, a cutoff ring surrounding said nozzle in cam filling position having a circular interior edge of greater diameter than said lip, a carrier for said ring, means for moving said carrier parallel to the axis of said nozzle, additional means for swinging said carrier in an arcuate path effective to cause said edge to wipe said lip, can gripping means on said carrier, means for arresting swinging movement of said carrier away from said nozzle, and means for releasing said gripping means prior to operation of said arresting means.

2. Can filling mechanism for use with a cohesive plastic material comprising a nozzle having a circular discharge lip, means for feeding material through said nozzle, a cutoff ring having an interior circular aperture of larger diameter than said circular lip surrounding said nozzle, said aperture including a semi-circular cutoff corner, a support for a can to be filled with material, and means for providing relative swinging movement between said can support and ring as a unit and said circular lip about an axis intersecting the axis of said circular lip and spaced from said ring and lip and parallel to the planes occupied by said ring and lip when said ring surrounds said nozzle to cause the cutoff corner of said ring to wipe the entire periphery of said lip.

3. Can filling apparatus comprising a downwardly depending nozzle having a circular lip, a cutoff ring having an arcuate edge of larger radius than said lip surrounding said nozzle above said lip during a can filling operation, means for moving said ring downwardly to cutoff position, means for gripping a filled can directly beneath said ring, and means for swinging said can gripping means and ring as a unit in an arcuate path to cause said edge to wipe said lip.

4. Apparatus as defined in claim 3 comprising means for arresting swinging movement of said can gripping means away from said nozzle, and means for releasing said gripping means just prior to completion of said swinging movement.

5. Apparatus as defined in claim 3 comprising means for applying a component of radially outward motion to said swinging motion prior to release of said gripping means.

6. Can filling apparatus comprising a depending nozzle having a circular lip, a support mounted for rocking movement about an axis above and perpendicular to the axis of said nozzle, a carrier on said support movable toward and away therefrom, a cutoff ring on said carrier having an interior arcuate edge movable in wiping relation over said lip, a receptacle clamp on said carrier, and a can supporting table movable vertically beneath said nozzle.

7. Apparatus as defined in claim 6, said ring being movable with said carrier to an upper position surrounding said nozzle to permit a can to be moved up over the lower end of said nozzle, stop means limiting downward movement of said carrier to a first position locating said ring in wiping position, and means providing for further movement of said carrier in the same direction during swinging of said support.

8. In can filling apparatus a nozzle having a circular lip, a cutoff plate having an enlarged central opening adapted to receive the end of said nozzle, an arcuate flange at the underside of said plate shaped to enter the open top of a can to be filled, said opening having an arcuate edge of greater radius than said lip movable in wiping relation completely across said lip.

9. Structure as defined in claim 8, said plate having a straight walled slot extending from one edge thereof with its opposite walls parallel and disposed tangentially to the central opening.

10. Structure as defined in claim 8, said flange being eccentric with respect to said opening and being substantially less than 360 degrees in extent and terminating at its ends at said opening.

11. In can filling apparatus, a pivoted support having a cutoff plate and can gripping means thereon, said plate including an arcuate flange of substantially less than 360 degrees extent positioned to be received within a can in said gripping means, means for swinging said support rapidly in an arcuate path and arresting its swinging motion abruptly, means for releasing said gripping means prior to completion of said swinging movement, said flange permitting separation of a can from said plate upon such release.

12. Structure as defined in claim 11 and means for imparting an outwardly radial component of motion to said plate and gripping means.

13. In can filling apparatus for filling an open topped can, a cutoff plate having a flat under surface to engage the top of a can, an arcuate flange depending from said plate and disposed to enter said can, an enlarged opening through said plate to receive the end of a filling nozzle, said plate having a slot extending from one side thereof into the central opening, the bottom of said slot intersecting the opening to define an arcuate wiping edge.

14. Structure as defined in claim 13, said slot having straight parallel side walls tangentially disposed with respect to the sides of said opening.

15. Structure as defined in claim 13, the side wall of said opening opposite said slot comprising a top surface.

16. Can filling apparatus comprising a depending nozzle terminating in a circular lip, a table movable vertically beneath said nozzle, a cutoff ring and can clamp normally adjacent said nozzle, means for feeding a cohesive plastic through said nozzle, means for raising said table to position a can thereon over the end of said nozzle, means responsive to downward movement of said table as the can is filled with material to actuate said clamp to grip the can, and swing said clamp and ring in an arcuate path causing said ring to wipe completely across said lip.

17. Apparatus as defined in claim 16 comprising means to release said clamp during its swinging movement to throw the filled can.

18. Apparatus as defined in claim 17 comprising means for returning said clamp and ring to position beneath said lip and to elevate said ring over said nozzle.

19. Apparatus as defined in claim 18 comprising means to advance an empty can onto said table, raise said table and to start said feeding means, and means to arrest said feeding means prior to swinging movement of said ring.

20. Means for severing a quantity of cohesive plastic material from the circular lip of a discharge nozzle comprising a cutoff plate having a substantially semi-circular cutoff edge normally spaced slightly beyond said lip, said edge being of larger radius than said lip, and means for relatively swinging said plate and lip in an arcuate path to cause said edge to wipe completely across said lip.

21. Can filling apparatus comprising a vertical filling tube having a downwardly directed discharge end, a can support below the end of said tube, a pivot support mounted adjacent the discharge end of said tube for swinging movement between can filling and can discharging position about an axis perpendicular to and intersecting the axis of said tube, a carrier carried by said pivot support, means mounting said carrier on said pivot support for rectilinear movement toward and away therefrom, the direction of such movement being vertical when said pivot support is in can filling position, a ring on said carrier surrounding said tube when said pivot support is in can filling position, and movable vertically thereon to engage and overlie the top of a can on said can support, a can clamp on said carrier, and means for swinging said pivot support about its pivot axis to remove a filled can from beneath said tube, said pivot support, carrier, can clamp and ring being movable as a unit during initial swinging movement of said pivot support, and latch means operable during swinging movement to release said carrier for movement away from said pivot support prior to completion of swinging movement of said pivot support to can discharging position.

22. Apparatus as defined in claim 21 comprising abutment means to arrest swinging movement of said pivot support.

23. Apparatus as defined in claim 21, the interior opening of said ring having an arcuate cutoff corner movable in wiping relation across the discharge end of said tube during swinging of said pivot support from can filling to can discharging position.

24. Apparatus as defined in claim 21, said can support being movable away from said tube during filling, power means for swinging said pivot support, and control means for said power means including means responsive to predetermined movement of said can support to initiate swinging movement of said pivot support from can filling to can discharging position.

25. Can filling apparatus comprising a vertical filling tube having a downwardly directed discharge end, a can support below said tube, power feed means for feeding cohesive material through said tube into a can on said can support, a cutoff ring overlying the top of a can on said can support, a releasable can clamp, means responsive to completion of filling of a can to arrest operation of said power feed means and to cause said clamp to grip a filled can and to move the filled can and said cutoff ring laterally from beneath said tube, to release said clamp, and to return said clamp and ring to position to cooperate with another can on said can support.

26. Apparatus as defined in claim 25 in which said can support is vertically movable during filling of a can thereon, and the means responsive to completion of filling of a can includes means actuated by predetermined movement of said can support.

FRANK R. DAVIS.

REFERENCES CITED

The following references are of record in the file of this patent:

UNITED STATES PATENTS

| Number | Name | Date |
| --- | --- | --- |
| 1,147,346 | Thompson | July 20, 1915 |
| 1,433,663 | Small | Oct. 31, 1922 |
| 1,593,189 | Mauch | July 20, 1926 |
| 2,113,081 | Doering | Apr. 5, 1938 |